(12) United States Patent
Boxsell

(10) Patent No.: US 6,574,917 B2
(45) Date of Patent: *Jun. 10, 2003

(54) HYDROPONIC APPARATUS USING ELLIPTICAL CONDUIT

(76) Inventor: Desmond James Boxsell, 301 Leacroft St., Burbank, Queensland 4156 (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,803
(22) Filed: Dec. 17, 2001
(65) Prior Publication Data

US 2002/0078625 A1 Jun. 27, 2002

Related U.S. Application Data

(63) Continuation of application No. 09/196,638, filed on Nov. 19, 1998, now Pat. No. 6,336,292, which is a continuation of application No. PCT/AU97/00321, filed on May 20, 1997.

(30) Foreign Application Priority Data

May 20, 1996 (AU) .............................. PN 9950

(51) Int. Cl.⁷ .............................. A01G 31/00
(52) U.S. Cl. ...................................... 47/62 C
(58) Field of Search .............................. 47/62 C, 62 R

(56) References Cited

U.S. PATENT DOCUMENTS

| | | |
|---|---|---|
| 3,872,621 A | 3/1975 | Greenbaum |
| D247,357 S | 2/1978 | Gray |
| 4,118,891 A | 10/1978 | Kehl et al. |
| 4,211,034 A | 7/1980 | Piesner |
| 4,860,490 A | 8/1989 | Morris et al. |
| 5,557,884 A | 9/1996 | Deppe |
| 5,558,461 A | 9/1996 | Van Dorp |
| 6,336,292 B1 * | 1/2002 | Boxsell ....................... 47/62 C |

FOREIGN PATENT DOCUMENTS

| | | |
|---|---|---|
| AU | 7700707/91 | 5/1991 |
| CN | 2144922 | 11/1993 |

OTHER PUBLICATIONS

"How to Grow 86 Different Plants in Hydroponics",Commercial Hydroponics, John Mason, "NFT Culture", 1990, pp. 36–42.

* cited by examiner

Primary Examiner—Charles T. Jordan
Assistant Examiner—Francis T. Palo
(74) Attorney, Agent, or Firm—Hoffman, Wasson & Gitler PC

(57) ABSTRACT

The present invention aims to alleviate at least one of the abovementioned disadvantages and to provide a hydroponic apparatus which will be reliable and efficient in use. Other objects and advantages of this invention will hereinafter become apparent.

2 Claims, 2 Drawing Sheets

HYDROPONIC APPARATUS USING ELLIPTICAL CONDUIT

This application is a continuation of U.S. patent application Ser. No. 09/196,638, filed Nov. 19, 1998 now U.S. Pat. No. 6,336,292 which is a continuation of PCT/AU97/00321 filed May 20, 1997.

FIELD OF THE INVENTION

This invention relates to a hydroponic apparatus.

This invention has particular but not exclusive application to a hydroponic apparatus, and for illustrative purposes reference will be made to such application.

BACKGROUND OF THE INVENTION

Hydroponics involves growing plants in the absence of soil, the necessary nutrients being delivered to the plants in the form of a nutrient solution in water, which passes over the roots of the plant. Hydroponic techniques have certain advantages over more conventional agriculture, which include the ability to carefully control optimum feeding, the elimination of weeds and it allows an improved control of pests and diseases. However, there is a high capital cost compared to traditional methods of agriculture. For this reason, hydroponic cultivation has to be carried out relatively intensively and efficiently if it is to be commercially viable.

One hydroponic method is where the roots of the plants are contained in gullies or conduits which are irrigated, generally continuously, with a nutrient solution.

Many designs for efficient, long lasting and easily installed gully or conduit systems have been trialed.

Various rigid and semi-rigid gullies and conduits are known.

For example, there are rigid plastic extruded conduits of rectangular or circular cross-section.

However, a number of disadvantages are evident with the existing rigid-type conduits. For example, with flat-based conduits, the nutrient flow is not always concentrated through the roots. Rather the flow of nutrients can pass either side of the roots, thus depriving the roots of maximum exposure to the nutrients. Furthermore, the flat top of such conduits tend to trap rain water which has a tendency which in turn may enter the conduit through the opening through which the plant is growing, thus diluting the nutrient solution.

With circular conduits, the roots of the plant are constrained such that, essentially, the lateral growth of the roots equals the longitudinal growth, whereas, in nature, it is preferred that the lateral growth be greater than the longitudinal growth. This can be obviated by transplanting the plant to a conduit having a larger internal diameter at an appropriate time in the development of the plant. However the additional handling of the plant increases costs of production. A further disadvantage of a circular conduit is that it is too "deep" for certain plants such as lettuce and herbs which only have a shallow root ball and thus cannot be effectively coated with the nutrient solution.

It is also known to provide a completely flexible plastic tube which is not dimensionally stable. The tube need to be filled with a growing medium and the tube takes the shape of the growing medium. Typically, these flexible tubes adopt a somewhat elliptical shape due to sagging of the growing medium in the tube. However the tube is completely filled with the growing medium and this impedes water flow, air circulation and is quite unsatisfactory.

SUMMARY OF THE INVENTION

The present invention aims to alleviate at least one of the abovementioned disadvantages and to provide a hydroponic apparatus which will be reliable and efficient in use. Other objects and advantages of this invention will hereinafter become apparent.

Throughout this specification, the term "substantially elliptical cross-section" is not limited to a cross-section which delineates a regular oval, but includes within its scope any related non-regular cross-section or similar but wherein the major axis remains of a greater length than the minor axis.

With the foregoing and other objects in view this invention relates to a hydroponic conduit comprising a dimensionally stable elongate member having at least one opening formed therein through which a plant may extend, wherein the elongate member is of substantially elliptical cross-section having an upper surface and a major axis, said at least one opening being formed in the upper surface of said member and wherein the major axis of the substantially elliptical cross-section of said member is substantially horizontal.

By being dimensionally stable, the hydroponic conduit can keep the desired elliptical cross-section without needing to be filled with a growing medium as is the case with an entirely flexible tube. Thus, the dimensionally stable elliptical conduit can be only partially filled with a growing medium that means that water circulation, air circulation and the like is improved.

Preferably, the elongated member includes a plurality of openings formed therein and wherein the spacing between adjacent openings may be determined by the type of plant to be grown. For example, the openings may be spaced at regular intervals longitudinally along one surface of the member and wherein each opening may be substantially co-axial with the minor axis of the member.

Because the elongated member may be initially provided to purchasers as a hollow elongated member without any openings formed therein, in one embodiment, an etched line may be provided along one surface of the member, such as a line co-axial with the minor axis of the member. The etch line may be used as a guide for the centre of openings to be cut into the member subsequently by the purchasers according to their individual requirements.

In use, the conduit would be used as a component of a hydroponic apparatus and in a method of hydroponic culture.

Therefore, according to a second aspect of the present invention, there is provided a hydroponic apparatus for use in hydroponic culture, said apparatus including:

at least one conduit comprising an elongated member of substantially elliptical cross-section, said conduit being provided with inlet means for introducing a nutrient solution into said conduit, outlet means for allowing the nutrient solution to exit said conduit and at least one opening formed therein through which a plant may extend.

In one embodiment there may be provided inlet means associated with each end of the conduit and outlet means associated with an intermediate portion of the conduit. In yet another embodiment the inlet means may be associated with a portion of the conduit intermediate the opposing ends of the conduit and wherein each end may include outlet means.

However, preferably the inlet means is associated with one end of the conduit and the outlet means is associated with the opposing end of the conduit.

The conduit is preferably of the type described above.

Furthermore, it will be appreciated that the apparatus may include a multiplicity of conduits positioned such that the major axes are substantially horizontal and in a side-by-side relationship. The conduits may be supported by a supporting structure such as a table.

The outlet means may include drainage means, such as a sump, which may be adapted to collect solid or semi-solid detritus and separate same from the exiting nutrient solution before the thus-depleted solution is returned to the inlet means of the conduit.

In yet another aspect of this invention, there is provided a method of hydroponic culture, said method including:

> providing a hydroponic conduit comprising an elongated member of substantially elliptical cross-section, said conduit being provided with inlet means for introducing a nutrient solution into said conduit, outlet means for allowing the nutrient solution to exit said conduit and at least one opening formed therein through which a plant may extend;
>
> supporting a seedling within said opening such that at least some of the roots of the seedling are retained within the conduit; and
>
> using the inlet means to introduce a sufficient quantity of a nutrient solution into said conduit to make contact with the roots of the seedling.

BRIEF DESCRIPTION OF THE DRAWINGS

In order that this invention may be more easily understood and put into practical effect, reference will now be made to the accompanying drawings which illustrate a preferred embodiment of the invention, wherein.

DETAILED DESCRIPTION OF THE INVENTION

Figure 1:
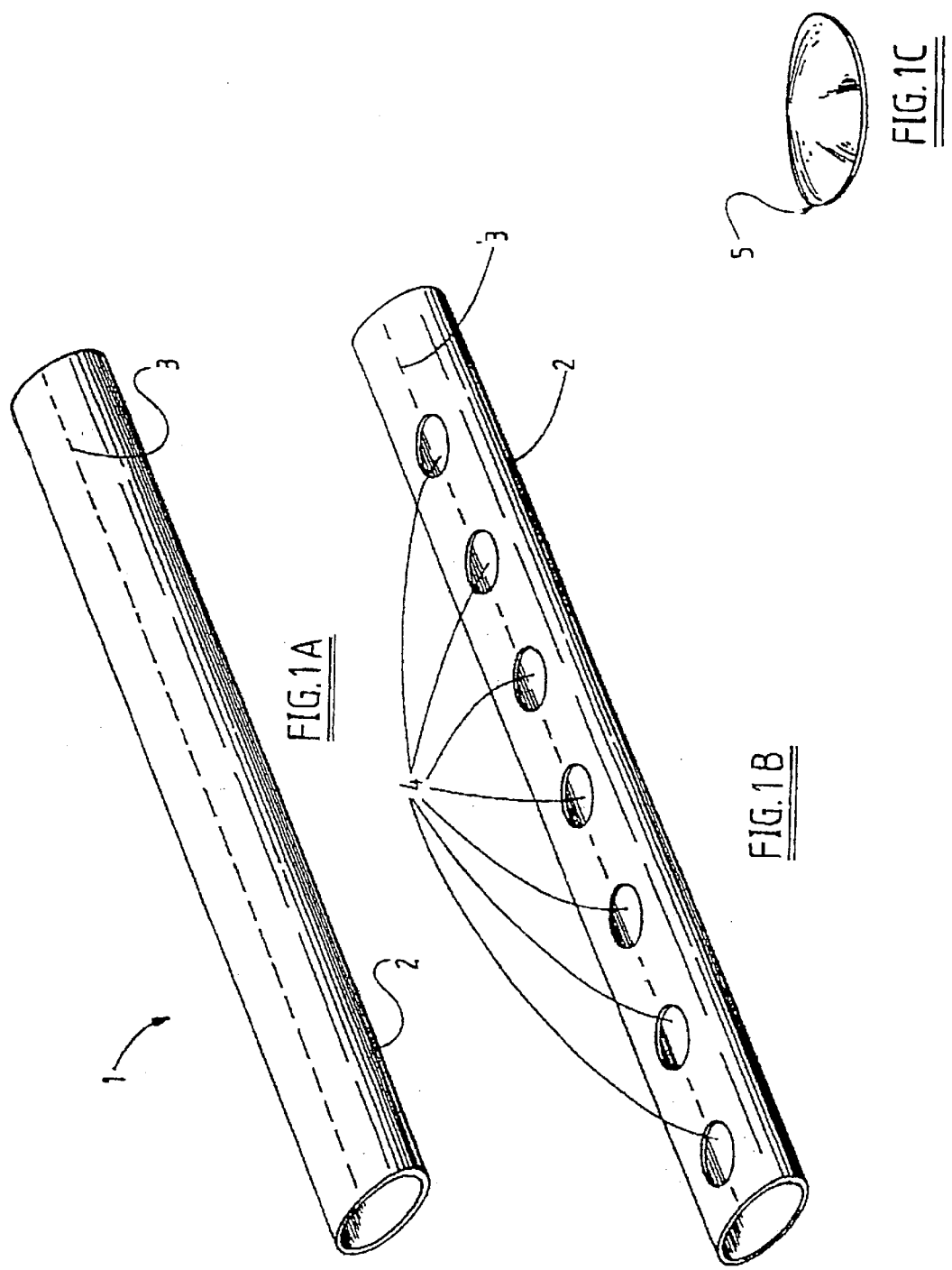
FIG. 1A is a preform of a conduit to be constructed in accordance with the present invention.
FIG. 1B is the preform of FIG. 1A further modified to a conduit constructed in accordance with the present invention.
FIG. 1C is the material removed from the openings in the conduit of FIG. 1B.

With reference to FIG. 1A, the preform 1 is an elongated hollow tube 2 of substantially elliptical cross-section. An etch line 3 is scored along one surface thereof co-axial with the minor axis of the tube 2. The etch line 3 identifies the centre of circular openings 4 spaced equi-distant along the surface of the tube 2 (FIG. 1B). The resultant cutouts 5 (FIG. 1C) are retained for future use in the construction of the apparatus depicted in FIG. 2.

Figure 2:
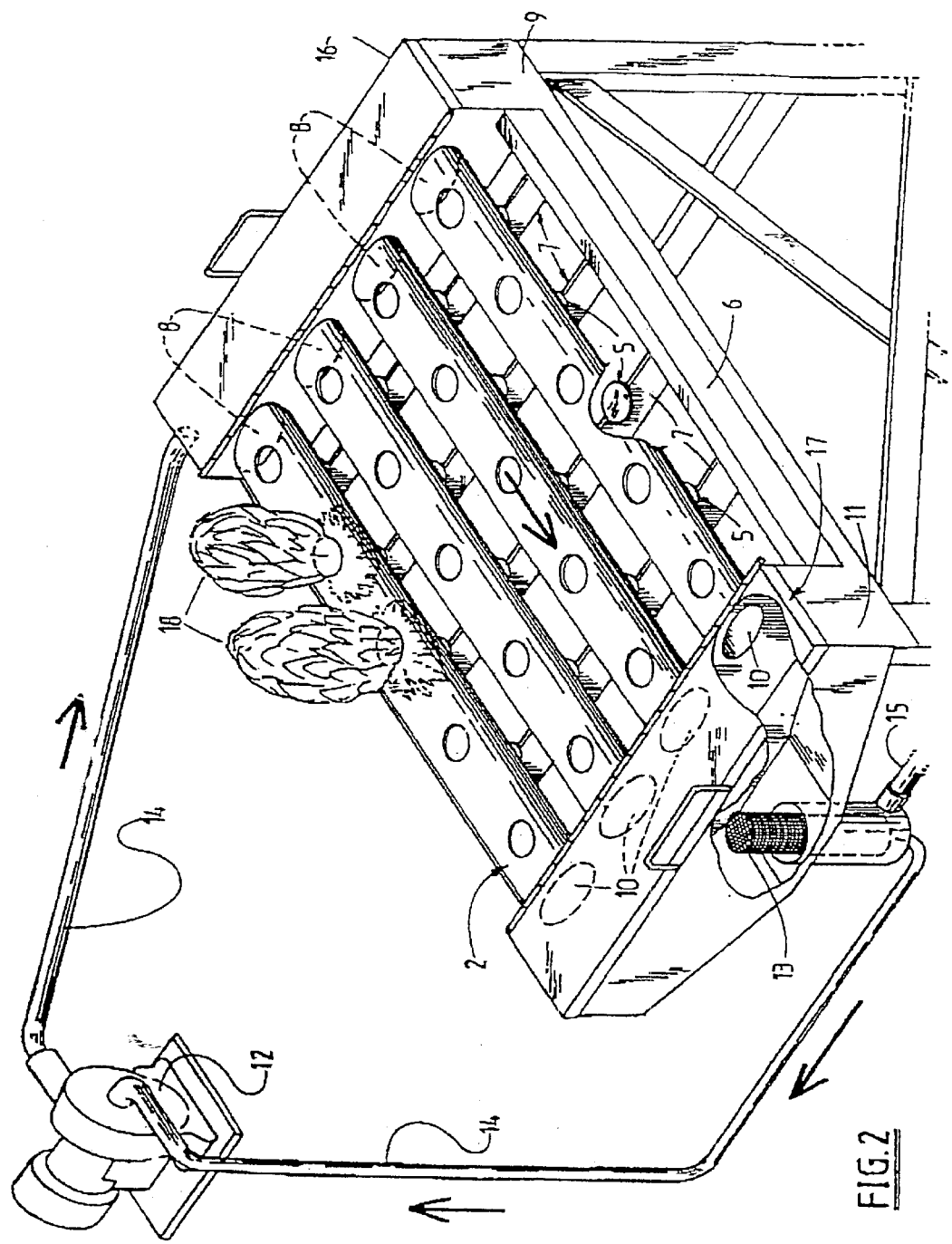
FIG. 2 is a hydroponic apparatus incorporating a multiplicity of the conduit of FIG. 1B.

The apparatus of FIG. 2 comprises a perimeter frame 6, the lateral sides of which are connected by spaced cross members 7. The cutouts 5 are fixed to the cross-members 7 to support the tubes 2—for example, they can be glued or rivetted into place, or affixed by any other suitable means known. The tubes 2 are then glued to the cutouts 5. The inlet end 8 of each tube 2 protrudes into a nutrient storage container 9 affixed to one end of the frame 6 by any suitable means. The outlet end 10 of each tube 2 protrudes into a sump (11) affixed to the opposite end of the frame 6 by any suitable means. A pump 12 pumps nutrient solution from the storage container 9 through the tube 2 to the sump 11 whereat the thus-pumped solution passes through any suitable filter 13 and is returned to the storage container 9 via piping 14 and the pump 12. As illustrated, a suitable filter could be a hollow net-like tube with small holes which allow the nutrient solution to pass through but not solids or semisolids. The detritus that remains in the sump 11 can be removed through any suitable drain 15. Each of the storage container 9 and sump 11 has a hinged lid 16 and 17 respectively which allows easy access to the contents thereof.

In use, seedlings 18 (only partly illustrated in FIG. 2) are restrained in the openings 4 by any convenient means and nutrient solution is pumped through the apparatus. The elliptical cross-section of the tube 2 ensures that the majority of the nutrient solution flows through the tube 2 at its lowest point thus ensuring maximum and continual contact of the solution with the root ball of the plants.

By using the present invention, it has been found that the plant growth is enhanced over prior art arrangements.

Although not wishing to be bound by theory, it is believed that this is due to, not only to the increased contact with the nutrient solution, but also to the better lateral growth of the root ball which imparts a "tumbling" action to the nutrient solution as it passes through leading to beneficial aeration of the nutrient solution. The growth rate of plants grown under these conditions is quicker, and the resultant plants appear healthier, over those grown by other hydroponic techniques. The elliptical surface of the conduit near the plant holes provides a better run-off for rain, thus reducing the entry of rain water into the conduit through the holes which would increase the dilution of the nutrient solution.

It will be appreciated that the above example is given as an illustration only of the present invention and that all such modifications and variations thereto as would be apparent to persons skilled in the art are deemed to fall within the broad scope and ambit of this invention as is herein defined in the appended claims.

I claim:

1. A hydroponic conduit comprising a dimensionally stable elongate member having at least one opening formed therein through which a plant may extend, wherein the elongate member is of substantially elliptical cross-section having an upper surface and a major axis, said at least one opening being formed in the upper surface of said member and wherein the major axis of the substantially elliptical cross-section of said member is substantially horizontal.

2. The conduit as claimed in claim 1, wherein said member has an etched line in the upper surface which functions as a guide to allow openings to be cut into the member.

* * * * *